July 29, 1969      W. L. CHASE      3,458,759

REMOTE CONTROL LIGHTING SYSTEM

Filed Nov. 3, 1967      6 Sheets-Sheet 1

INVENTOR.
WILLIAM L. CHASE
BY
Christie, Parker & Hale
ATTORNEYS.

INVENTOR.
WILLIAM L. CHASE
BY
Christie, Parker & Hale
ATTORNEYS.

FIG. 7.

United States Patent Office 3,458,759
Patented July 29, 1969

3,458,759
REMOTE CONTROL LIGHTING SYSTEM
William L. Chase, La Crescenta, Calif., assignor to Current Control Devices, Inc., Pasadena, Calif., a corporation of California
Filed Nov. 3, 1967, Ser. No. 680,496
Int. Cl. H05b *37/02, 39/04, 41/36*
U.S. Cl. 315—312             11 Claims

ABSTRACT OF THE DISCLOSURE

There is shown a lighting arrangement particularly suited to aircraft in which a group of lights are arranged to illuminate each one of a corresponding group of seats, the group of lights being mounted above the seats with each seat having a switch for controlling its associated light. A common control line going to each of the seat groups and each of the lighting groups is time-shared by the switches at the seats to control the respective lights. Each group of seats and each group of lights has its own control module synchronized from a common strobe pulse source.

Background of the invention

This invention relates to aircraft lighting systems, and more particularly a modular control system for individual seat lighting from each seat, permitting rapid change of seating arrangements with a minimum of cabling in the system.

In commercial transports in service today, it is common to arrange the seats in groups of two or three seats and to provide a group of overhead lights for illuminating each seat area. The lights are mounted directly above the seats and are provided with individual light switches which can be operated by the occupant of the seat by reaching up and operating the switch on the light panel. When changing from three seat to two seat groupings, for example, the light panels can be replaced with panels incorporating two lights instead of three. Since the switches are directly associated with the lights and the lighting panels, no wiring changes are necessary, and only a single power line need go to each lighting panel.

With the new super-transports of the large size suitable for accommodating four and five hundred passengers, it is necessary for the lights to be mounted considerably above the seats, making it impractical for the switches to be placed at the lights. It is therefore desirable to provide switches at the seat on the arm rest, for example, for remotely controlling a light mounted high above he seat and out of reach of a seated passenger. To interconnect each switch with its associated light through suitable conductors running from the seat down through the floor across to the outer fuselage up and around to the lighting group presents several problems. Such conventional wiring arrangement does not provide the flexibility desired in changing seating arrangements within the airplane. Also, the amount of wire involved becomes a considerable weight factor in the large five hundred seat capacity aircraft presently being designed for commercial service.

The present invention is directed to an improved lighting system which is modular in construction and which requires a minimum of wire in the form of busses which interconnect the modules. A total weight saving in excess of a factor of ten is realized by a reduction in the total wiring involved over individual switch and light wiring. In addition, the modular arrangement provides maximum flexibility in changing seating arrangements as to the number and spacing of seats and the associated lighting.

Summary of the invention

These and other advantages of the present invention over the prior art are achieved by a time-sharing control system in which the "ON" or "OFF" condition of the light switches located at the seats is sampled in time sequence and the corresponding lights are turned on or off in response to the switch condition. This system is self-addressing so that the desired light is always controlled from its own switch even though all the lights are controlled from a single common data bus. Flexibility is accomplished by making the system modular with a separate switch control circuit module being mounted on each group of seats and with a separate light control circuit module being mounted with each group of lights. Synchronizing strobe pulses are coupled to each of the circuit modules from a common strobe pulse source. Strobe pulses operate through the control circuit modules to activate the switches and associated lights in pairs and in sequence, while the condition of an activated switch is communicated to the associated light by the common data bus.

Brief description of the drawings

The above and other advantages of the present invention may be better understood by reference to the accompanying drawings, wherein:

FIGURE 3 is a schematic block diagram of a switch control circuit module for a seat unit;

Description of preferred embodiments

Figure 1:
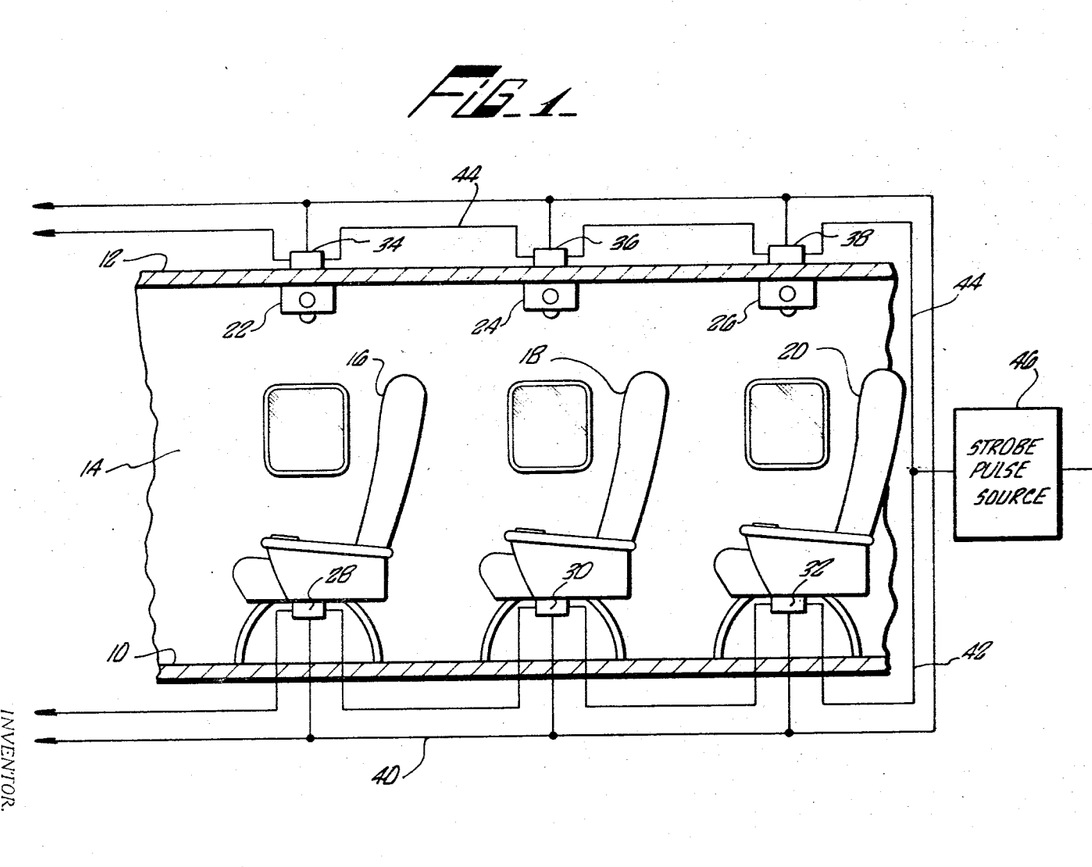
FIGURE 1 is a diagrammatic view of a typical installation incorporating the present invention.

Referring to FIGURE 1, there is illustrated schematically a section of an airplane compartment having a floor 10, an overhead panel 12 and outer fuselage 14. Rows of seats are indicated generally at 16, 18 and 20. Each row is typically made up of seat units of two or three adjacent seats for first-class or coach operation, respectively. Each seat unit can readily be detached from the floor or shifted along the floor to provide different seating spacings and arrangements. Associated with each group of seats and supported by the overhead panel 12 is a lighting group, three lights being indicated respectively at 22, 24 and 26. Each lighting group includes a number of lights corresponding to the number of seats so that each seat is provided with its own illumination. In addition to the seat lights, each lighting group usually includes a Stewardess Call light, there being one call light for each group of seats.

Each seat in a group is provided with two switches which may, for example, be mounted on a small switch panel on the top or side of an arm rest associated with each seat. One switch provides means for turning on and off the overhead illumination while the other switch provides a means for signalling the stewardess. In addition, each group of seats is provided with a switch control circuit module which may, for example, be mounted beneath one of the seats, as indicated at 28, 30 and 32 for the three seat groups illustrated in FIGURE 1. Similarly, each of the lighting groups is provided with a lighting control circuit module, three of which are indicated respectively at 34, 36 and 38. Interconnection between the switch control modules and the light control modules is provided through a common conductor 40 while all of the switch modules and light modules are connected in series through conductors 42 and 44 respectively back to a strobe pulse source 46. In addition, each of the modules is connected to a common power source (not shown).

Figure 2:
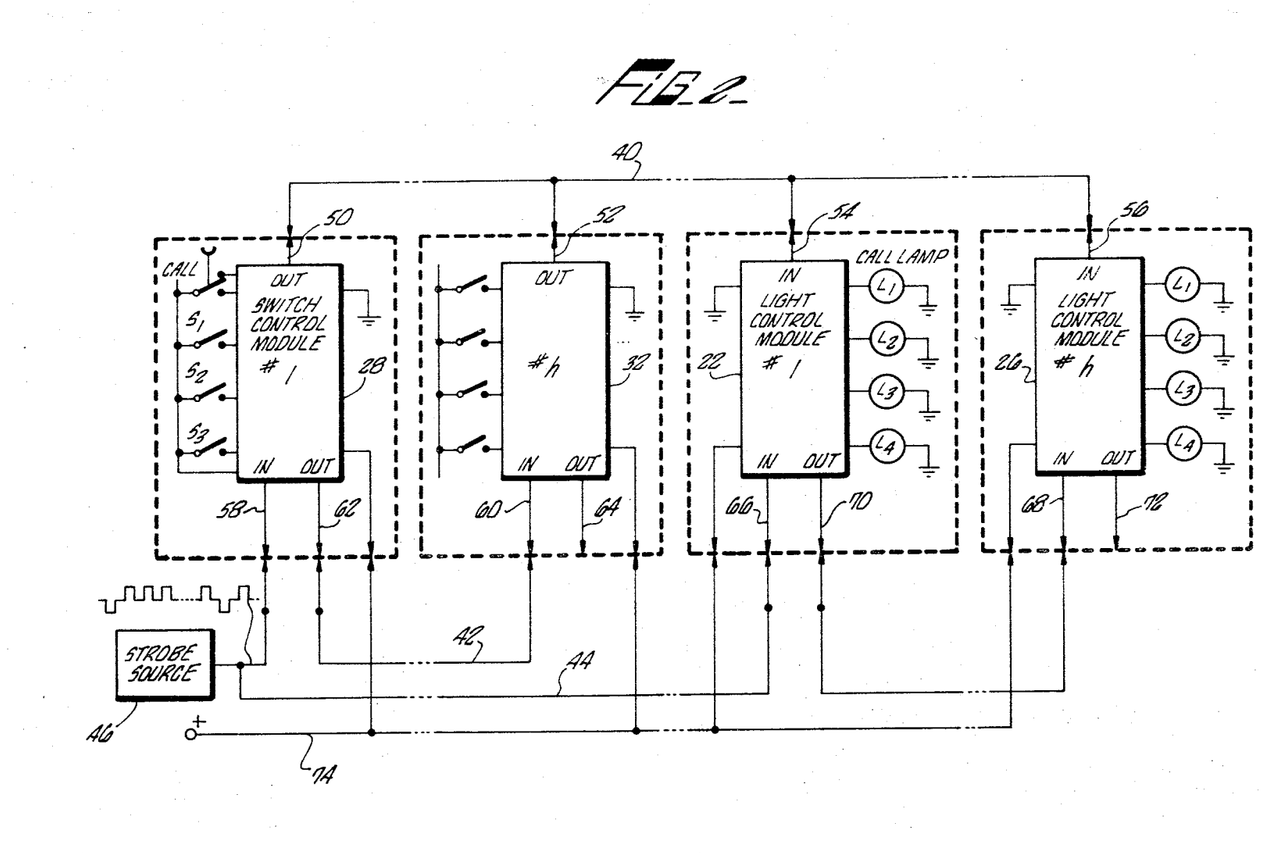
FIGURE 2 is a block diagram of the lighting system of the present invention.

The interconnection between the circuit modules is shown in more detail in FIGURE 2. Each seat switch control module has an output terminal, two of which are indicated at 50 and 52, connected to the common bus 40. The bus 40 connects to input terminals, indicated at 54 and 56, on each of the light control modules. In addition, each switch control module is provided with a strobe input terminal, such as indicated at 58 and 60, and a strobe output terminal, such as indicated at 62 and 64. Switch control modules are serially connected through the strobe terminals to the strobe source 46 by a bus 44. Thus, the strobe pulse source 46 is connected directly to the input terminal 58 of the first switch control module 28. The output strobe terminal 62 in turn is connected to the input terminal of the next switch control module whose output terminal, in turn, is connected to the input terminal of the next switch control module.

Similarly, each of the light control modules is series connected back to the stroke source 46 through the bus 44 in serial fashion by means of strobe input terminals and stroke output terminals indicated, respectively, at 66, 68 and 70, 72. In addition, each of the circuit modules is energized from a suitable positive potential source (not shown) through a supply bus 74 and all modules are connected to a common ground return.

As pointed out above, each seat in a group is provided with its own light control switch, three such switches being indicated in FIGURE 2 for the switch control module 28. Closing of one of these three switches, labelled $S_1$, $S_2$ and $S_3$, operates, in a manner hereinafter described in detail, a corresponding one of three lights associated with the light control module 22, indicated at $L_1$, $L_2$ and $L_3$. In addition, a Call Stewardess switch of a push button type having two switch positions is provided at the switch control module for operating a call lamp associated with the light control module.

Referring to FIGURE 3, there is shown in more detail a switch control circuit module. The strobe source 46 is arranged to generate a negative pulse on the output followed by a series of positive pulses corresponding in number to the total number of lights to be controlled by the system. The negative pulse, when received at the strobe input terminal 58 of the switch control module, is coupled by means of a diode 80, connected to pass the negative pulse but to block the positive pulses, to the input of an inverter circuit 82. The positive-going pulse output of the inverter circuit is applied to one side of a group of bistable flip-flops 84, 86, 88 and 90. Thus, the negative pulse acts to reset all of the flip-flops to the first of its bistable states, hereinafter referred to as the "0" or "Reset" state of the flip-flops. Subsequent positive strobe pulses at the input 58 are passed by a diode 92 and are applied to the flip-flop 84 to set it to the opposite or second stable state, hereinafter referred to as the "1" or "Set" state. The strobe pulses are also applied to each of a group of AND circuits 94, 96, 98 and 100, the outputs of which are all connected to the common data bus 40.

The "0" state of the flip-flop 84 is applied to the AND circuit 94 and also the "0" state of a flip-flop 102 is applied to the input of the AND circuit 94. The flip-flop 102 is controlled by the Stewardess Call switch which is connected so that when the switch is pressed momentarily, it sets the flip-flop 102 in the "0" state and if it is pulled up momentarily, it sets the flip-flop 102 into the "1" state as pointed out above. Normally, there would be three call switches connected in parallel, one call switch for each seat in a group of seats associated with the switch control module. It will be noted that only one of the Call switches is shown in FIGURE 3.

The first strobe pulse following the resetting pulse is passed by the AND circuit 94 to the data bus 40 if the Call switch has been previously pressed and the flip-flop 102 set to the "0" state. Since the same strobe pulse sets the flip-flop 84 to the "1" state, no subsequent strobe pulses are passed by the AND circuit 94 until the flip-flop 84 has been again reset by a negative pulse at the strobe input terminal 58.

In a similar fashion, the "0" state of the flip-flop 86 is applied to the AND circuit 96 and also a positive level is applied to the AND circuit 96 through the switch $S_1$. However, the "1" state of the flip-flop 84 is also applied to the AND circuit 96 so that a strobe pulse is now passed to the data bus 40 by the AND circuit 96 since a previous strobe pulse has set the flip-flop 84 to the "1" state. Thus, if the switch $S_1$ is closed, the second strobe pulse is applied to the data bus 40 since the first strobe pulse sets the flip-flop 84 to the "1" state. The "1" state of the flip-flop 84 is also applied to a gate 104 for gating strobe pulses to the flip-flop 86 to set it to the "1" state.

Similarly, the "1" state of the flip-flop 86, the "0" state of the flip-flop 88 and the switch $S_2$ are connected to the input of the logical AND circuit 98 for passing the next strobe pulse in sequence to the data line 40 if the switch $S_2$ is closed. A gate 106 controlled by the "1" state of the flip-flop 86 gates a strobe pulse to set the flip-flop 88 to its "1" state.

In identical manner, the chain is continued so that the logical AND gate 100 is controlled by the "1" state of the flip-flop 88, the "0" state of the flip-flop 90 and the switch $S_3$. The flip-flop 90 is set by the next strobe pulse passed by a gate 108 to which the "1" state of the flip-flop 88 is applied.

It will thus be seen that the switch control circuit module generates a pattern of output pulses in time sequence in synchronism with the strobe pulses. The presence or absence of a pulse during each strobe interval of the time sequence indicates whether the light switch has been turned on or is turned off. The "1" state of the flip-flop 90 is also applied to a logical AND circuit 110, together with the strobe pulses passed by the diode 92. Thus the next and all subsequent strobe pulses received at the strobe input are passed on to the AND gate 110 with the setting of the flip-flop 90 to the "1" state. The output of the AND circuit 110 is connected to the strobe output terminal 62 together with the negative pulse passed by the diode 80. In this manner, the next switch control circuit module in series receives strobe pulses only after each of the previous modules in a series have been strobed.

Figure 4:
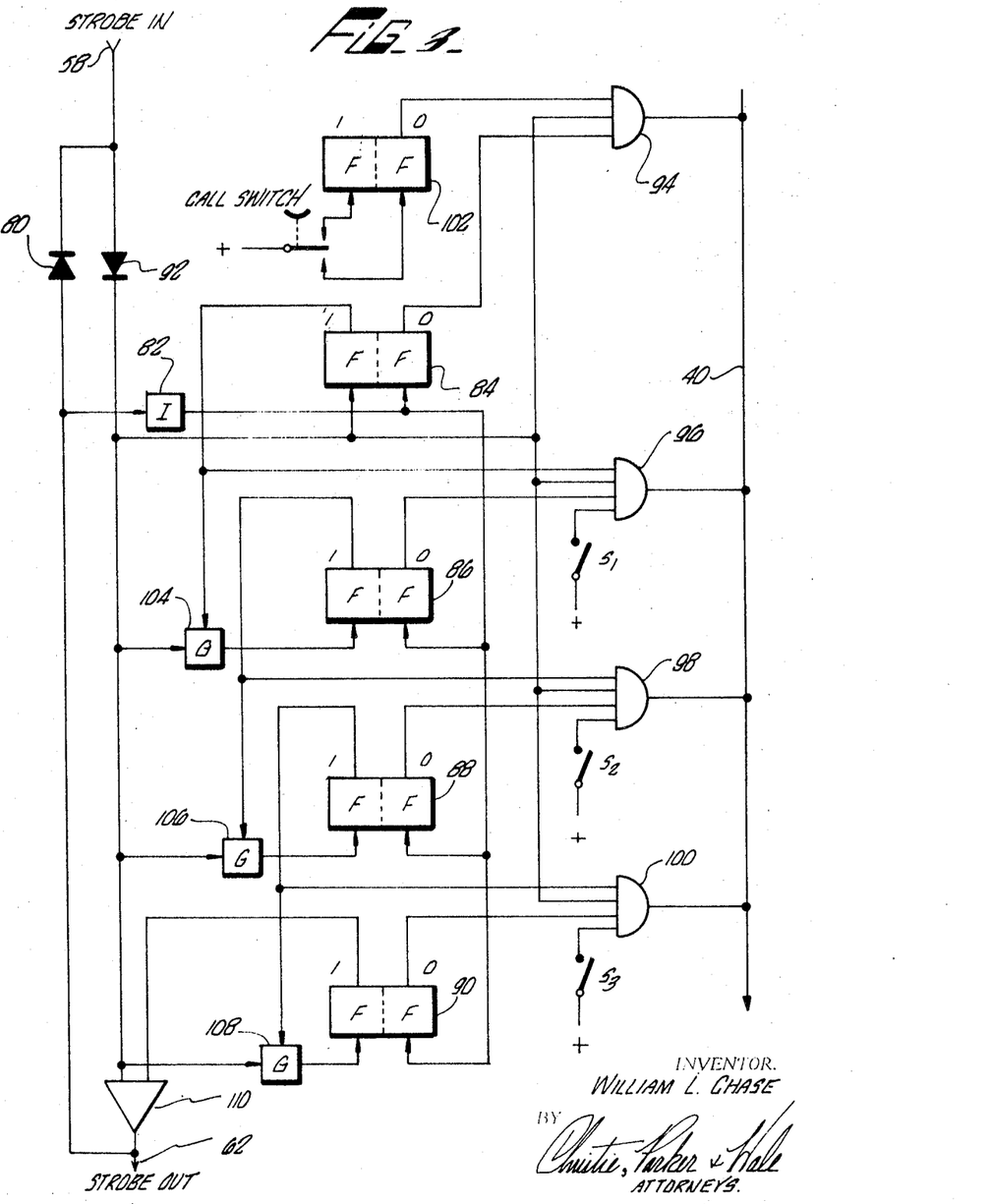
FIGURE 4 is a schematic block diagram of a light control circuit module for a light unit.

As in a switch control module described above, strobe pulses from the strobe source 46 are applied to the strobe input terminal 66 of a light control module, as shown in FIGURE 4. The negative resetting pulses are passed by a diode 112 to an inverter 114, the output of which is applied to the resetting input of bistable flip-flops 116, 118, 120 and 122. The "Reset" or "0" state of the flip-flop 116 is applied to a logical AND circuit 124, together with positive strobe pulses passed by a diode 126 connected to the strobe input terminal 66. The data bus 40 from the switch control modules is also connected to the AND circuit 124. Thus the first positive strobe pulse is passed by the AND circuit 124 if and only if there is a coincident pulse on the data bus 40.

The output of the AND circuit 124 is applied to a retriggering one-shot or monostable multivibrator type circuit 128. This circuit is set by input pulses and remains set for a predetermined period of time when it resets itself back to its initial stable state unless in the interim an additional input pulse is received. Thus, as long as input pulses are received at intervals less than the resetting interval of the one-shot circuit, it remains triggered. The output of the one-shot circuit 128 controls a gate 130 which gates power to the Call lamp. Similarly, the light $L_1$ is controlled by a retriggering one-shot circuit 132 controlling a gate 134. The one-shot circuit 132 is triggered by the output of a logical AND circuit 136 having its inputs connected to the data bus 40, to the "0" state of the flip-flop 118, to the strobe pulses passed by the diode 126, and to the "1" state of the flip-flop 116. The flip-flop 118 is set to the "1" state by a gate 138 to which is applied the "1" state of the flip-flop 116 and a strobe pulse passed by the diode 126.

In identical fashion, the lights $L_2$ and $L_3$ are controlled by one-shot circuits 140 and 142, respectively, through gates 144 and 146. One-shot circuit 140 is triggered by the output of a logical AND circuit 148 which senses the "0" state of the flip-flop 120, the "1" state of the flip-flop 118, a strobe pulse and a pulse on the data line 40. The one-shot circuit 142 is controlled by a logical AND circuit 150 which senses coincidence between the "1" state of the flip-flop 120, the "0" state of the flip-flop 122, a strobe pulse and a pulse on the data line 40. The flip-flop 120 is set for the "1" state by gate 152 to which is applied a strobe pulse and the "1" state of the flip-flop 118 while the flip-flop 122 is set to the "1" state by the output of the gate 154 to which is applied a strobe pulse and the "1" state of the flip-flop 120.

Since the flip-flops 116 through 122 are set to the "1" state by successive strobe pulses, the AND circuits 124 through 150 sample successive pulse intervals to determine whether a pulse or no pulse exists on the data line 40. In order to get the proper alignment between a particular switch and a corresponding light, it is only necessary that the switch control module and the light control module occupy the same relative position in a series chain performed by the strobe line and the modules. As in the case of the switch control circuit modules, the light control circuit modules pass strobe pulses on to the next module only after the last flip-flop has been set. To this end, the "1" state of the flip-flop 122 is applied to a logical AND circuit 156 together with the strobe pulses passed by the diode 126. The output of the logical AND circuit is applied to the strobe output terminal 70 together with the negative resetting pulses passed by the diode 112.

Because of the large size of the airplane, it is desirable to divide the plane up into a number of separate lighting systems. Strobe pulse timing generators are located in a number of fixed locations within the airplane. To provide complete flexibility in seating arrangements, it is desirable to apply strobe pulses to a group of series connected seat and light units from either end of the series connections. In other words, instead of having an input terminal and an output terminal for strobe pulses, as provided by the circuits described above in connection with FIGURES 3 and 4, it is desirable to have both terminals function either as an input terminal or an output terminal. Such an arrangement is shown in the seat module of FIGURE 5 and the lighting module of FIGURE 6.

Figure 5:
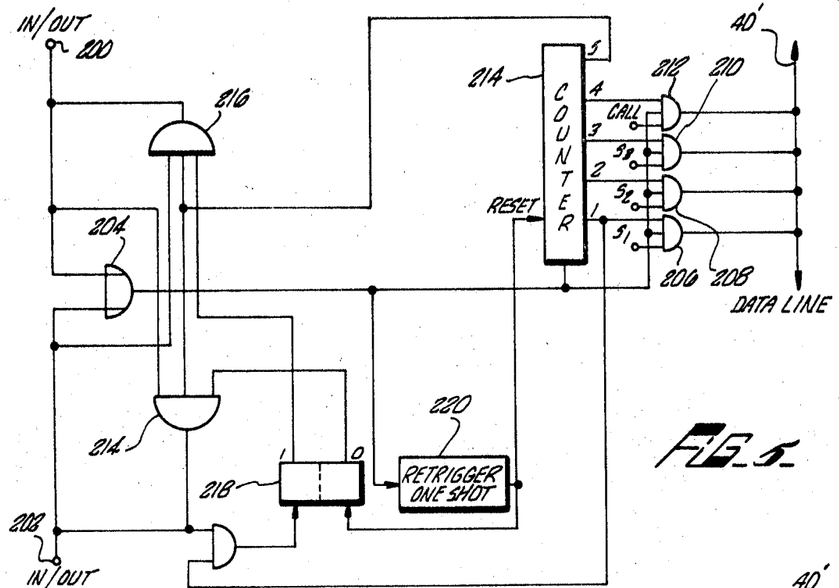
FIGURES 5 and 6 are schematic block diagrams of a modified switch control module and light control module in which strobe pulses can be applied to the series connected modules in either direction.

Referring to FIGURE 5, the seat module circuit is provided with two strobe terminals 200 and 202, both of which may serve either as an input terminal or an output terminal. Both terminals are connected to an OR circuit 204 so that strobe pulses applied to either of the terminals 200 or 202 are transmitted to the output of the OR circuit 204. The strobe pulses from the output of the OR circuit 204 are applied to the four output AND circuits 206, 208, 210 and 212, the outputs of which are connected to the data line 40'. The strobe pulses are also applied to a counter 214 which has five count conditions. The first count condition is applied to the AND circuit 206, the second count condition to the AND circuit 208, the third count condition to the AND circuit 210, and the fourth count condition to the AND circuit 212. When the counter is reset, it is in the first count condition. Each of the light control switches $S_1$, $S_2$, $S_3$ and the Stewardess Call switch are connected respectively to the AND circuits 206, 208, 210 and 212. Thus the first strobe pulse applied to either the terminal 202 or the terminal 200 is passed by the AND gate 206 to the data line if the switch $S_1$ has been set. Similarly, the next strobe pulse, which advances the counter 214 to the next count condition is passed by the AND circuit 208 if the switch $S_2$ has been set. As the counter advances through the count 3 and 4 conditions, the AND circuits 210 and 212 are also strobed by successive pulses and generate output pulses on the data line 40' depending upon the condition of the switch $S_3$ and the Call switch.

The fourth strobe pulse also advances the counter 214 to the count 5 condition which is its maximum count condition. The count 5 condition of the counter 214 is applied to two AND circuits 214 and 216. Strobe pulses from the terminal 200 are applied to the AND circuit 214, while strobe pulses applied to the terminal 202 are applied to the AND circuit 216. The output of the AND circuit 214 is connected to the terminal 202 while the output of the AND circuit 216 is connected to the terminal 200. A flip-flop 218 provides a control level either to the AND circuit 214 or to the AND circuit 216 depending upon the condition of the flip-flop 218. Normally the flip-flop is set so that the AND circuit 214 gates strobe pulses from the terminal 200 to the terminal 202. However, if the strobe pulses come in on the terminal 202, they change the flip-flop 218 to its other stable state in which the AND circuit 216 is set to pass pulses on to the terminal 200. Thus it will be seen that after the first four pulses are received on either the terminal 200 or the terminal 202, all subsequent strobe pulses are passed on directly from one terminal to the other terminal of the circuit module.

Subsequent strobe pulses at the output of the OR circuit 204 have no effect on the counter 214 which remains in the 5 count condition until it is reset. The resetting circuit in the circuit of FIGURE 5 comprises a retriggering one-shot circuit 220. As long as strobe pulses are applied to the retriggering one-shot circuit by the output of the OR circuit 204, the one-shot circuit remains set, but whenever the strobe pulses are interrupted for at least two or three pulse periods, the retriggering one-shot resets itself, and at the same time applies a reset pulse to the counter 214 and to the flip-flop 218. In this manner, instead of utilizing a negative pulse as in the arrangement of FIGURES 3 and 4, a delay interval corresponding to three pulse intervals is provided between each strobing cycle to reset all of the modules.

Figure 6:
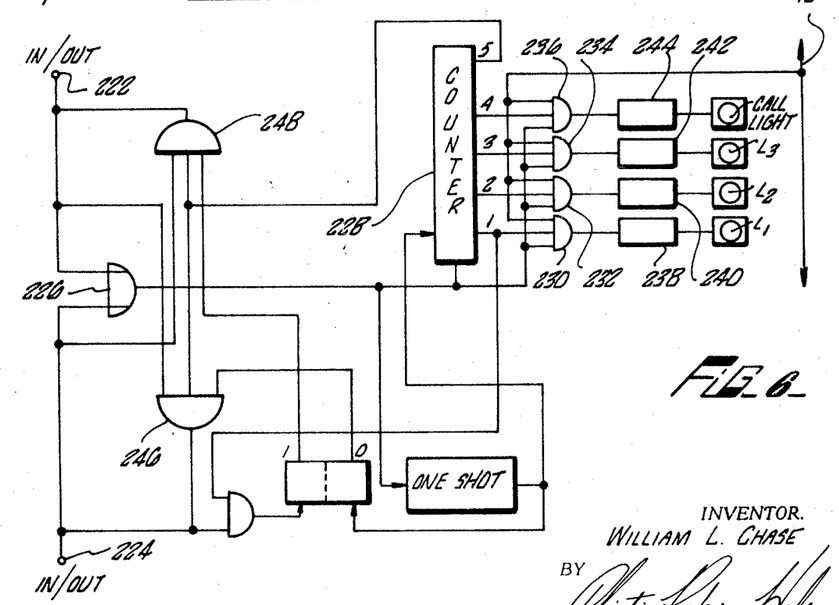

The lighting module circuit, as shown in FIGURE 6, is similarly provided with terminals 222 and 224, either of which may receive strobe pulses and which are applied to an OR circuit 226 from which they are applied to a counter 228 and four AND circuits 230, 232, 234 and 236. The data line 40' is also coupled to each of the AND circuits 230, 232, 234 and 236, together with the successive outputs of the counter 28. Thus if a pulse is received on the data line 40' in coincidence with a strobe pulse and in coincidence with the appropriate count condition of the counter 228, a pulse is passed by one of the AND circuits, the output of which is applied to a retriggering one-shot circuit, as indicated respectively at 238, 240, 242 and 244. One pulse every strobbing cycle is sufficient to hold the retriggering one-shot circuits in a set condition in which the associated one of the lights $L_1$, $L_2$ $L_3$ and the Call light are turned on.

The fifth count condition of the counter 228 is applied to AND circuits 246 and 248, which in turn are controlled by a flip-flop 250, so as to pass strobe pulses on from one input terminal to the other input terminal after the counter 228 has been advanced by four strobe pulses.

Figure 7:
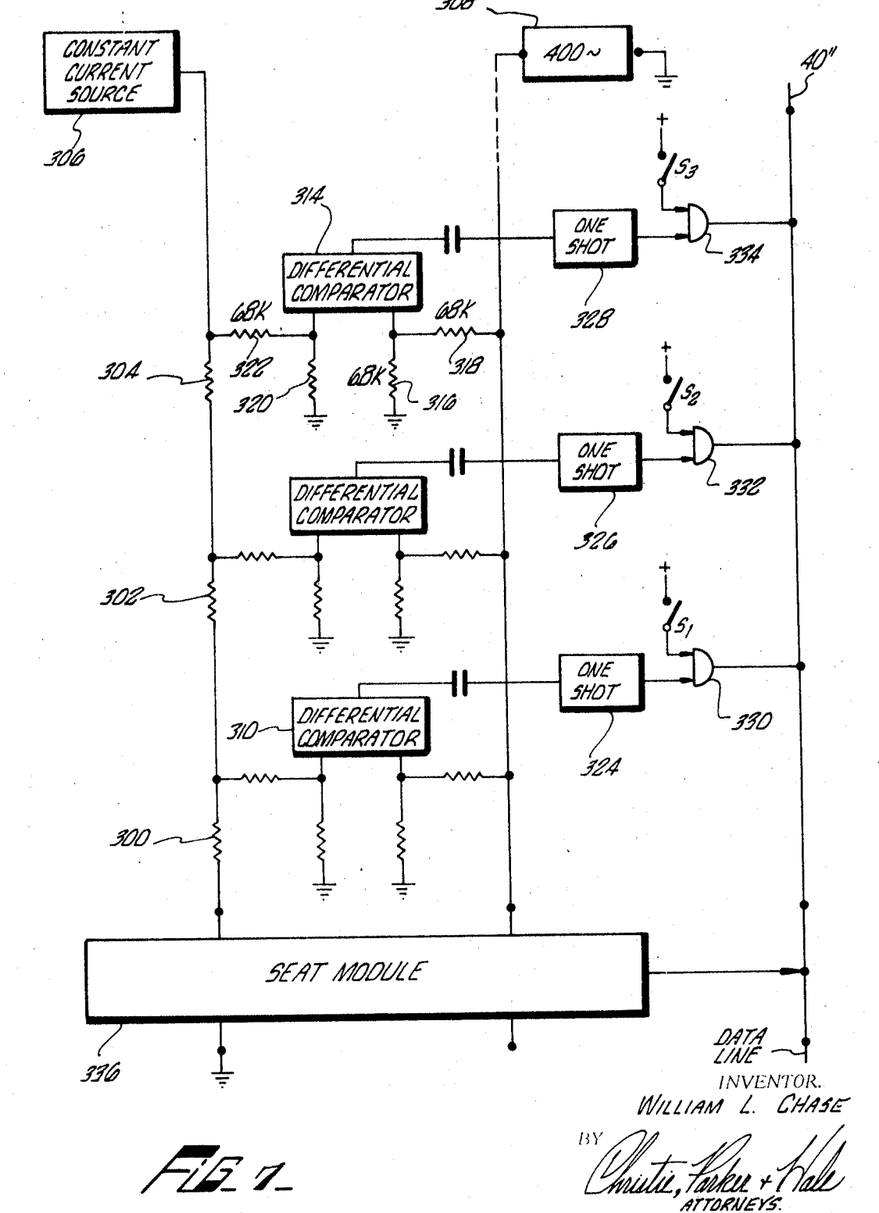
FIGURE 7 is a schematic block diagram of a further modified switch control module not requiring any strobe pulses.

An alternative strobing arrangement which eliminates the need for a pulse generator of any sort is shown in FIGURE 7. Again the modules are connected in series with each module including a voltage divider string including three resistors, indicated at 300, 302 and 304. When all the modules are connected in series, the series connected voltage divider string of all the modules is connected across a constant current supply 306. These resistors are all equal in value and typically of relatively low resistance such as, for example, 100 ohms. The constant current source 306 ensures that the incremental voltage drop across each of the resistors will be substantially the same even through the number of seat and lighting modules in the system may vary.

The voltage at each point in the divder string is compared with a 400 cycle voltage from a source 308. The comparison is done by a differential comparator circuit, three of which are indicated at 310, 312 and 314. The differential comparator circuit has two inputs and a single output, the output assuming one of two levels depending upon the relative polarity of the two inputs. One input of each differential comparator is connected to the junction point of a voltage divider extending between one side of the 400 cycle supply voltage and ground, the voltage divider including a resistor 316 and a resistor 318. The other input to each differential comparator circuit is similarly connected through a voltage divider consisting of a resistor 320 and a resistor 322 connected between a tap on the divider string and ground.

The output of each differential comparator is applied to a one-shot multivibrator, three of which are indicated at 324, 326 and 328. In the seat module circuit, the output of the one-shot multivibrator is applied to an AND circuit, such as indicated at 330, 332 and 334. A positive level is applied selectively to each of the AND circuits by closing one of the lighting switches $S_1$, $S_2$ and $S_3$. The output of the AND circuits are all connected to the common data line 40″.

In operation, the seat module then provides pulses on the data line at controlled intervals according to the setting of the light control switches. The timing intervals are determined by the fact that the changing voltage level on the output of the 400 cycle source 308 matches the voltage at each of the junction points in the divider string at successive points in time, causing the differential comparator circuits to be switched in succession.

Each lighting module (not shown) is substantially the same circuit as the seat module except that the data line 40″ is applied to each of the AND gates in place of the switch control levels shown in FIGURE 7. Thus coincidence between a pulse on the data line and a pulse from the output of the one-shot multivibrator produces an output at the associated AND gate. This output pulse operates to turn on the associated reading light in the identical manner described above in connection with FIGURE 4. A large number of seat module circuits and light control module circuits of the type shown in FIGURE 7 may be connected together in a string in the manner indicated by the seat module block 336.

From the above description, it will be seen that the present invention provides a modular lighting control system which requires a minimum of interconnecting wiring between the seat units and the associated light units. The only permanent wiring in the aircraft frame itself is a single strobe line for the seats and a single strobe line for the lights into which series connections can be made and, in addition, a common data bus interconnects all of the switch control and light control modules. The savings in weight and the flexibility of the system more than offset any additional costs involved in the more complex circuitry. By utilizing integrated circuit techniques for each of the control modules, the modules can be made extremely small and light weight.

What is claimed is:

1. An aircraft lighting system for controlling an individual light from each of a plurality of seats through a common control, said system comprising a light control switch associated with each seat, a common transmission line, a strobe pulse source for generating a train of pulses, means including said switches and coupled to said pulse source for gating selected ones of successive strobe pulses to said transmission line depending on the setting of said switches, mean for generating a plurality of separate output pulse signals in timed sequence synchronism with the strobe pulses, light control means associated with each light for turning on the light, and gating means associated with each light control means, one of said output signals and the transmission line being coupled to the gating means for activating each of the light control means to turn on its associated light in sequence in response to coincidence between the associated output signal and a pulse on the transmission line.

2. Apparatus as defined in claim 1 wherein said light control means includes means for turning off the associated light after a predetermined time unless again activated in response to the gating means output.

3. Apparatus as defined in claim 1 wherein said means for gating selected strobe pulses to the transmission line comprises a series of circuit modules connected in series to the strobe pulse source, each module including a plurality of bistable elements initially set to a first stable state, means responsive to successive input strobe pulses from said source for sequentially setting the bistable elements in one module to a second stable state, and gating means responsive to the last bistable element to be set in the sequence for passing input pulses directly to the next module in series when said last bistable element has been set to its second stable state.

4. Apparatus as defined in claim 3 wherein said strobe pulse source generates strobe pulses of a first polarity and resetting pulses of the opposite polarity at a common output, each module including means responsive to the polarity of the input pulses for resetting all of the bistable elements in response to each resetting pulse, and means for coupling resetting pulses from the input of a module to the output.

5. Apparatus as defined in claim 1 wherein said means coupled to the pulse source for generating a plurality of output signals comprises a series of circuit modules connected in series to the strobe pulse source, each module including a plurality of bistable elements initially set to a first stable state, means responsive to successive input strobe pulses from said source for sequentially setting the bistable elements in one module to a second stable state, and gating means responsive to the last bistable element to be set in the sequence for passing input pulses directly to the next module in series when said last bistable element has been set to its second stable state.

6. Apparatus as defined in claim 5 wherein said strobe pulse source generates strobe pulses of a first polarity and resetting pulses of the opposite polarity at a common output, each module including means responsive to the polarity of the input pulses for resetting all of the bistable elements in response to each resetting pulse, and means for coupling resetting pulses from the input of a module to the output.

7. A system for operating a plurality of electrical loads from a corresponding plurality of switches over a single transmission line, comprising first means for repeatedly pulsing a plurality of separate outputs in timed sequence, means including one of said switches coupled to each of said outputs for selectively coupling each of the pulsed outputs to the transmission line, second means for repeatedly pulsing a plurality of separate outputs in timed sequence, means for synchronizing the first and second pulsing means, gating means coupled to the transmission line and to each of said outputs of the second pulsing means for providing separate output signals in response to coincident pulses on the transmission line and each of the outputs of the second pulsing means, and means responsive to said separate output signals from the gating means for energizing corresponding ones of said loads for a predetermined period of time greater than the repetition time of said first and second pulsing means.

8. Apparatus as defined in claim 7 wherein said synchronizing means comprises a strobe pulse source, and said first and second pulsing means each comprise a plurality of modules connected in series to the strobe pulse source, each module including counting means, means responsive to pulses received from the source for advancing the counting means through a predetermined number of count conditions, and means controlled by the counting means for gating strobe pulses from the source to the next module in series when the counting means is advanced through said predetermined number of counts.

9. Apparatus as defined in claim 8 wherein each module includes two terminals, either of which may receive pulses from the source, means for coupling both terminals to the counting means to apply pulses from either terminal to the counting means, and wherein said last-named gating means includes means responsive to a pulse received at one of said terminals for selectively gating pulses from said one terminal to the other terminal when the counting means is advanced to said predetermined count condition, whereby either terminal of a module may receive pulses and the other terminal then transmits pulses.

10. Apparatus as defined in claim 7 wherein said first and second pulsing means each comprise a voltage divider having a plurality of taps, a plurality of differential comparator circuits having two input terminals and an output terminal, the comparator circuits generating an output pulse when the voltage difference between the two inputs reaches a predetermined level, one input terminal being coupled to a tap on the voltage divider, and means for coupling a periodic voltage simultaneously to the other input terminal of all the comparator circuits.

11. In a lighting system for aircraft or the like wherein passenger seats are arranged in multiple seat units and the lighting is arranged in multiple light units with one light illuminating an associated seat, apparatus for controlling the light associated with a particular seat from a switch mounted adjacent the seat, comprising a plurality of switch control modules, one switch control module being mounted on each seat unit, a plurality of light control modules, a strobe pulse source, each switch control module and each light control module having a strobe input and a stroke output, all the switch control modules being connected in series with the output of each module connected to the input of the next module by a single conductor, all the light control modules being connected in series with the output of each module connected to the input of the next module by a single conductor, each of the switch control modules having a single data pulse output and each of the light control modules having a single data pulse input and a common conductor connecting each of said data pulse inputs and outputs.

References Cited

UNITED STATES PATENTS

| | | | |
|---|---|---|---|
| 3,267,459 | 8/1966 | Chomicki et al. | 307—208 |
| 3,405,315 | 10/1968 | Moreland | 315—315 |

JOHN W. HUCKERT, Primary Examiner

J. D. CRAIG, Assistant Examiner

U.S. Cl. X.R.

307—203, 208, 112, 157; 315—320